United States Patent [19]

Schallenberger et al.

[11] 4,323,428
[45] Apr. 6, 1982

[54] RECONSTITUTABLE FUEL ASSEMBLY FOR A NUCLEAR REACTOR

[75] Inventors: John M. Schallenberger, O'Hara Township, Allegheny County; Stanley Kmonk, Plum Borough; Stephen J. Ferlan, Wilkins Township, Allegheny County, all of Pa.

[73] Assignee: Westinghouse Electric Corp., Pittsburgh, Pa.

[21] Appl. No.: 92,237

[22] Filed: Nov. 7, 1979

[51] Int. Cl.³ .............................................. G21C 3/30
[52] U.S. Cl. .................................... 376/353; 376/446
[58] Field of Search .................................... 176/76, 78

[56] References Cited

U.S. PATENT DOCUMENTS

| | | | |
|---|---|---|---|
| 3,770,583 | 11/1973 | Klumb | 176/78 |
| 3,828,868 | 8/1974 | Jabsen | 176/78 |
| 3,861,999 | 1/1975 | Zmola | 176/78 |
| 3,992,259 | 11/1976 | Anthony | 176/78 |
| 3,997,394 | 12/1976 | Aisch | 176/78 |
| 4,208,248 | 6/1980 | Jabsen | 176/78 |

*Primary Examiner*—Donald P. Walsh
*Attorney, Agent, or Firm*—J. R. Campbell; Z. L. Dermer

[57] ABSTRACT

A reconstitutable fuel assembly for a nuclear reactor which includes a mechanical, rather than metallurgical, arrangement for connecting control rod guide thimbles to the top and bottom nozzles of a fuel assembly. Multiple sleeves enclosing control rod guide thimbles interconnect the top nozzle to the fuel assembly upper grid. Each sleeve is secured to the top nozzle by retaining rings disposed on opposite sides of the nozzle. Similar sleeves enclose the lower end of control rod guide thimbles and interconnect the bottom nozzle with the lowermost grid on the assembly. An end plug fitted in the bottom end of each sleeve extends through the bottom nozzle and is secured thereto by a retaining ring. Should it be necessary to remove a fuel rod from the assembly, the retaining rings in either the top or bottom nozzles may be removed to release the nozzle from the control rod guide thimbles and thus expose either the top or bottom ends of the fuel rods to fuel rod removing mechanisms.

6 Claims, 4 Drawing Figures

RECONSTITUTABLE FUEL ASSEMBLY FOR A NUCLEAR REACTOR

BACKGROUND OF THE INVENTION

The invention described herein relates to nuclear reactor fuel assemblies and more particularly to a reconstitutable assembly having removable top and bottom nozzles.

Conventional designs of fuel assemblies include a multiplicity of fuel rods and control rod guide thimbles held in an organized array by grids spaced along the fuel assembly length. Top and bottom nozzles on opposite ends thereof are secured to the control rod guide thimbles which extend slightly above and below the ends of the fuel rods. At the top end of the assembly, the guide thimbles are welded in openings provided in the top nozzle while those at the lower end are attached to the bottom nozzle by a shoulder bolt which is locked and then welded in position.

During operation of such assembly in a nuclear reactor, the fuel rods may occasionally develop cracks along their length resulting primarily from internal stresses thus establishing the possibility that fission products having radioactive characteristics may seep or otherwise pass into the primary coolant of the reactor. Such products may also be released into a flooded reactor cavity during refueling operations or into the coolant circulated through pools where the spent fuel assemblies are stored.

Under these circumstances, it is difficult to detect and remove failed fuel rods because they are part of an integral assembly of guide tubes welded to the top and bottom nozzles. Consequently, to gain access to individual fuel rods, it is necessary to remove the affected assembly from the nuclear reactor core and then break the welds which secure the top and bottom nozzles to the control rod guide thimbles. In so doing, the destructive action often renders the fuel assembly unfit for further use in a reactor because of the damage done to both the guide thimbles and the top and bottom nozzles.

In view of the high costs associated with replacing defective and damaged parts, both domestic and foreign utilities have indicated an interest in reconstitutable fuel assemblies in order to minimize both their operating and maintenance expenses.

SUMMARY OF THE INVENTION

Briefly stated, the invention is directed towards a reconstitutable fuel assembly which incorporates design features arranged to permit the rapid removal of individual failed fuel rods, the option to replace rods, followed by the additional use in the reactor and/or normal handling and storage of the affected fuel assembly. Reconstitution is made possible by providing a fuel assembly with removable top and bottom nozzles. The nozzles are mechanically fastened to opposite ends of each control rod guide thimble assembly, and either nozzle can be removed remotely from an irradiated fuel assembly while it is still submerged in neutron-absorbing liquid. Since either nozzle can be removed, access to the bottom or top end of the fuel assembly for the detection and removal of failed fuel rods from any location within the assembly is thus made possible. An option is also made available to an operator to replace rods from either end of the assembly and after the appropriate nozzle has been remounted on the control rod guide thimble tubes, the reconstituted assembly can then be reinserted into the reactor and used until the end of its useful life, and/or stored in spent fuel pools or other places in a safe, normal manner.

BRIEF DESCRIPTION OF THE DRAWINGS

The subject matter of the invention is particularly pointed out and distinctly claimed in the concluding portion of this specification. The invention, however, both as to organization and method operation, together with further advantages thereof, may best be understood by reference to the following description taken in connection with the accompanying drawings in which:

Figure 1:
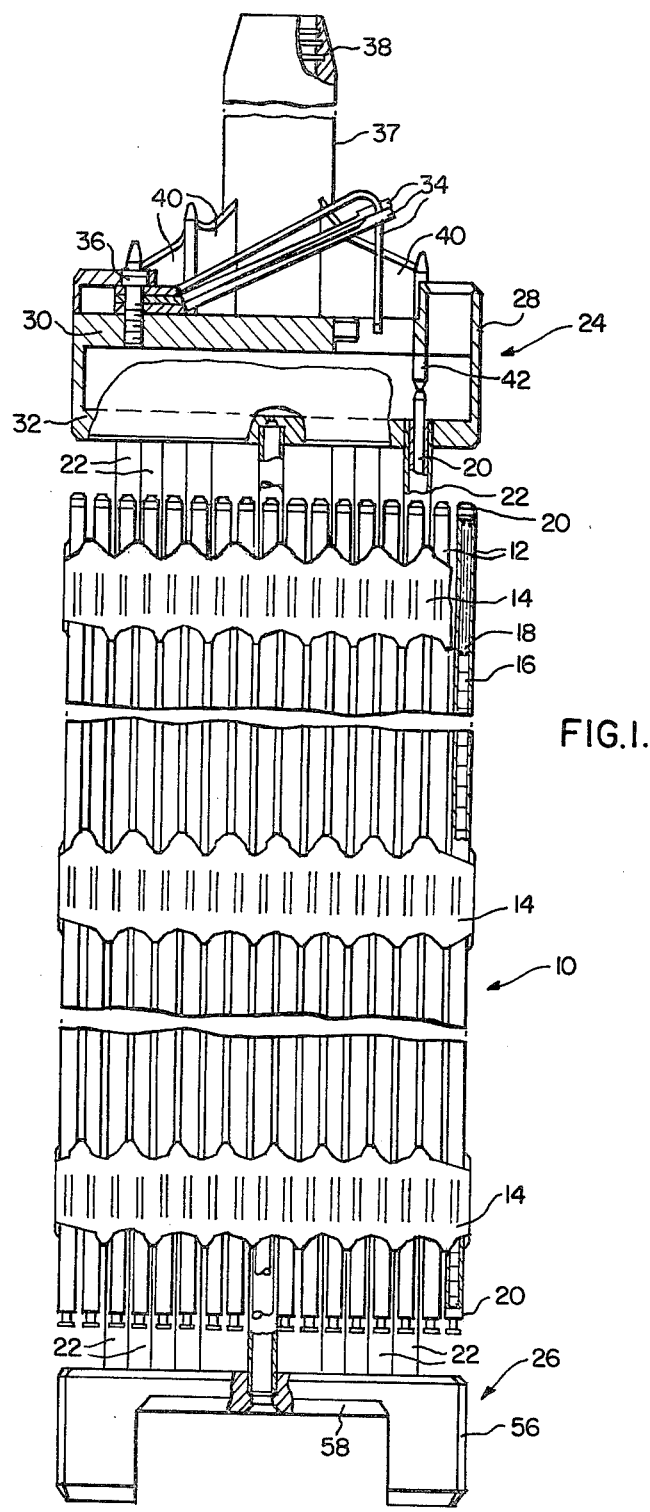
FIG. 1 is a view in elevation partly in section, illustrating the design of a fuel assembly which incorporates features arranged to permit the separate removal of the top nozzle and bottom nozzle in the assembly.
Figure 2:
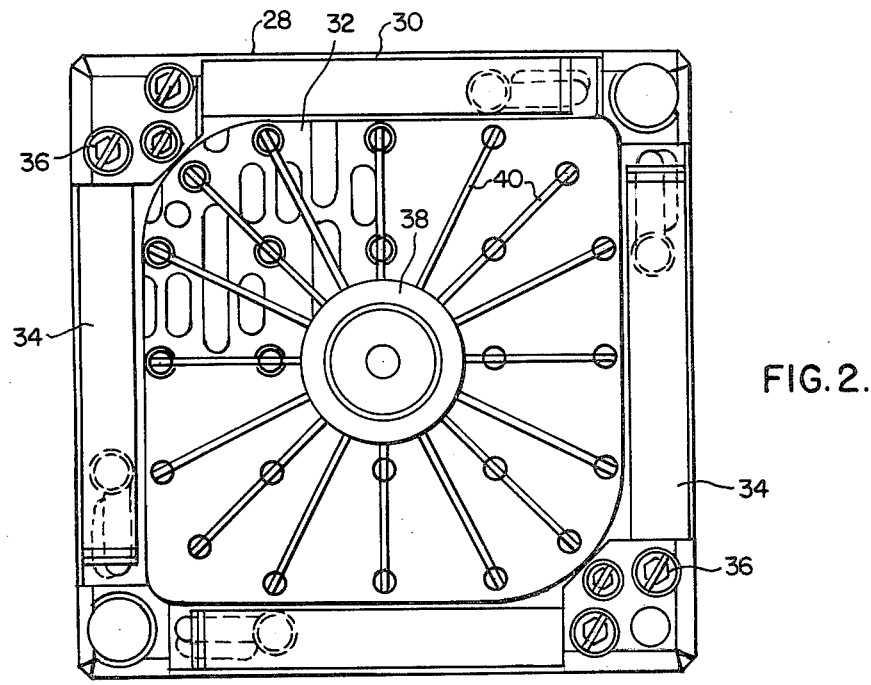
FIG. 2 is a plan view of the fuel assembly shown in FIG. 1.
Figure 3:
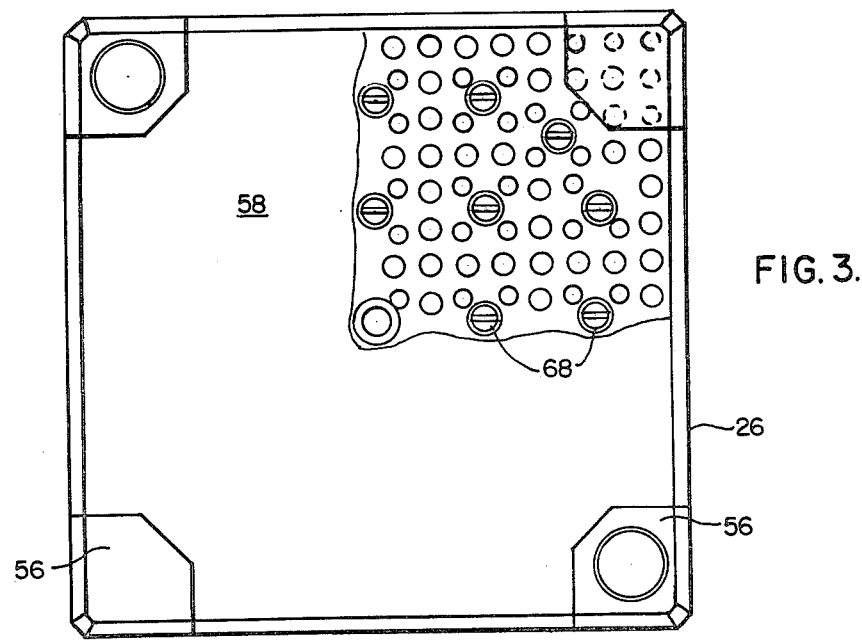
FIG. 3 is a bottom view of the fuel assembly illustrated in FIG. 1.

Referring now to the drawings wherein like reference characters designate like or corresponding parts throughout the several views, there is shown in FIGS. 1-3 a nuclear reactor fuel assembly 10 including an array of fuel rods 12 held in spaced relationship to each other by grids 14 spaced along the fuel assembly length. Each fuel rod includes nuclear fuel pellets 16 and a spring 18 located in the plenum of each fuel rod, and the ends of the rods are closed by end plugs 20, all in a conventional manner.

To control the fission process, a multiplicity of control rods 21 are reciprocally movable in control rod guide tubes or thimbles 22 located at predetermined positions in each selected fuel assembly in the reactor. The reactor includes a top nozzle 24 and a bottom nozzle 26 to which opposite ends of the control rod guide thimbles 22 are attached to form an integral assembly capable of being conveniently handled without damaging the assembly components.

As illustrated in FIGS. 1, 2 and 3, the nozzles are square in cross section and the top nozzle comprises a housing 28 having an upper plate 30 spaced from a lower adapter plate 32. Assembly hold-down springs 34 attached to opposite sides of upper plate 30 are held in place by bolts 36 and are adapted to be compressed when the reactor upper core plate (not shown) is placed in position. The top nozzle further includes a rod cluster control assembly 37 comprising an internally-threaded cylindrical member 38 having radially-extending flukes or arms 40. A connector 42 interconnects each control rod 21 with the arms, the arrangement being such that the rod cluster assembly moves the control rods vertically in the control rod guide thimbles to thereby control the fission process in the assembly.

In prior designs the control rod guide thimbles were welded respectively to the top and bottom nozzles thereby precluding replacement of individual fuel rods without rendering the nozzle and control rod guide thimbles unsuitable for further use. To overcome this serious disadvantage, according to the present invention, the nozzle are mechanically fastened, instead of metallurgically fastened, to opposite ends of the control rod guide thimbles which extend the length of the fuel assembly. The improved structure permits each nozzle to be removed remotely from an irradiated fuel assembly while it is submerged in a neutron absorbing liquid, thus providing access at the top and bottom end for the detection and removal of failed fuel rods from either the top or bottom and from any location within the assembly.

Figure 4:
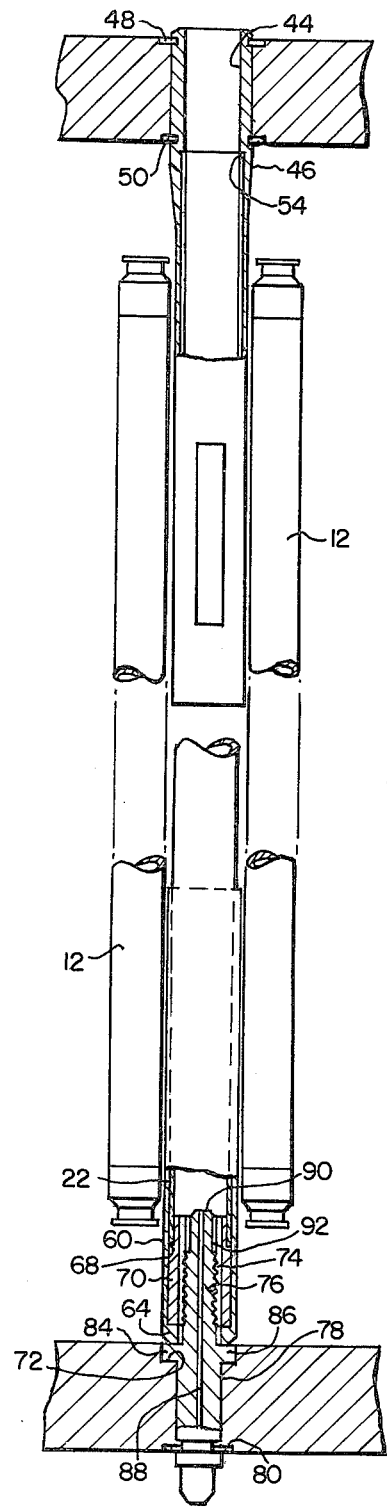
FIG. 4 is an enlarged view showing how a control rod guide thimble is removably attached to the upper nozzle and a lower nozzle in a fuel assembly.

Referring to the upper part of FIG. 4 which illustrates the arrangement for supporting the top nozzle on control rod guide thimbles, the top nozzle adapter plate 32 is provided with a multiplicity of openings 44 which correspond in number to the control rod guide thimbles for the particular assembly, e.g., 24 guide thimbles for a 17×17 fuel assembly. A sleeve 46 preferably of Inconel having a wall 48 of increased thickness over the main body of the sleeve is placed in each of the adapter plate openings. It is held in place by a pair of split retaining rings 49, 50 pressed in shaped slots or recesses in the adapter plate top and bottom surfaces and in circumferential grooves machined in the sleeve outer surface. The bowed retaining ring 50 in the lower groove must be partially flattened to enable the later insertion of the upper flat ring to thereby provide a preloaded connection across the adapter plate. The lower ring 50 serves as a stop member when the nozzle is set in place. When the retaining rings 49 are removed from the sleeves, the nozzle may be lifted off rings 50 because rings 50 are not locked to the nozzle. The retaining ring material is preferably Inconel for maximum strength and optimum retention of elastic properties.

The section of increased thickness of thimble sleeve 46 also makes possible the provision of a lip 54 which is contacted by the upper end of control rod guide thimble 22. Since control rods must move in an unimpeded manner in the control rod guide thimble, both control rod guide thimbles and that portion of the sleeves above the lip are designed to have the same inner diameter. As in prior designs, each of the sleeves are of a diameter slightly greater than a grid cell and includes four rectangular-shaped openings 55 spaced at 90° intervals around the sleeve. Each such opening has a length sufficient to bridge the height of a grid strap so that when the sleeve is placed in a grid, the sleeve material at the opening snaps over its strap thus locking the sleeve to the grid. To further secure the sleeve to the top grid 14 in the assembly, the sleeve is bulged outwardly at points immediately above and below the grid straps. Bulging is used if the materials are different, i.e., zircaloy guide thimble sleeves and stainless steel grids, but the parts are welded when the materials are the same.

The bottom nozzle 26 includes feed 56 shaped to rest on a bottom core plate in the reactor, and upper section 58 formed integral with the nozzle is designed to receive and support the guide thimbles 22 at their lower end. Each sleeve 60 of uniform inner and outer diameter encloses guide thimble 22. The sleeve is attached to the lowermost grid on a fuel assembly and extends downwardly to engage and rest on the top surface of of a flange 84 on an end plug extension 76 having the same diameter as the sleeve. The bottom end of the sleeve includes an inwardly directed flange shoulder 64 having a central opening 66 of lesser diameter than the main body of the sleeve. The bottom of each guide thimble 22 engages a lip 68 on the guide thimble end plug 70. End plug 70 fits inside the sleeve 60 and rests on shoulder 64. The plug has a central threaded bore 72 which receives the threaded end 74 of end plug extension 76. The body 78 of the plug extension extends downwardly through the nozzle and includes a circumferential groove 80 of a size sufficient to receive a bowed split retaining ring 82. The flange 84 of increased diameter rests on the recessed surface 86 and coacts with the retaining ring 82 to hold the end plug in the bottom nozzle. A central passage 88 of 0.040" diameter meters reactor coolant into the main body of the guide thimble. The top 90 of the end plug extension extends above end plug 70 and an annulus 92 between these parts serves as a well for the accumulation of any particulate in the coolant. A hex or other opening 94 in the bottom of the end plug extensions is designed to receive a tool used to tightly draw the parts together in those cases when the plug extension is screwed into the end plug under circumstances where the fuel assembly is submerged in water.

To secure the bottom nozzle 26 to the ends of control rod guide thimbles 22, sleeves 60 are brazed to the bottom grid 14 in the usual manner. The guide thimbles having end plugs 70 already welded in the ends thereof are placed in the sleeves thus providing an assembly designed to receive the threaded end plug extensions 74. The end plug extensions 74 are thereupon screwed into the tapped holes in the guide thimble end plugs 70, thus drawing the parts together into a relatively rigid structure. A tack weld is made at the junction of parts 64 and 84. The bottom nozzle is then positioned in place so that the body 78 of each end plug extension extends through their complementary openings in the bottom nozzle plate 58, and retaining rings 82 snapped into place to lock the bottom nozzle to the control rod guide thimbles.

After the top and bottom nozzles are attached to a fuel assembly in the manner described above, it is placed in a reactor core for operation. In the event one or more fuel rods need to be replaced, the assembly is lifted from its core position and either the top or bottom nozzle may be removed. This action exposes the ends of fuel rods which may be removed and replaced at will. Either the original or replacement nozzles may be attached and the assembly reinstalled in the reactor core for the balance of its normal expected life. The above described design also permits access to fuel rods in an assembly to allow for the transfer of partially spent fuel rods from one damaged skelton, for example, to another thus permitting the fuel rods to achieve their intended burnup levels. The design further permits access for the removal and/or rearrangement of fuel rods to attain better uranium utilization in the reactor.

It will be apparent that many modifications and variations are possible in light of the above teachings. It therefore is to be understood that within the scope of the appended claims, the invention may be practiced other than as specifically described.

What is claimed is:

1. A reconstitutable fuel assembly comprising:
   an array of parallel fuel rods held in spaced relationship with each other by grids spaced along the fuel rod length;
   a multiplicity of control rod guide thimbles interspersed among said rods, said thimbles being immovably attached to said grids;
   a top nozzle and bottom nozzle located at opposite ends of said fuel rods and guide thimbles;
   separate upper and lower control rod guide thimble sleeves enclosing the ends of said control rod guide thimbles and being arranged to respectively interconnect said top and bottom nozzles with said grids;

each of said upper sleeves connecting said top nozzle with a grid including a section extending through the top nozzle and having an inner diameter just sufficient to accept a control adapted to reciprocate therein;

separate removable mechanical fasteners on the upper surface of said top nozzle, each of said fasteners having a configuration which permits locking engagement between a sleeve and said top nozzle, and stop members on the opposite side of said top nozzle, each of said stop members being positioned to coact with said nozzle and a sleeve having a fastener on the other side of the nozzle, to help removably lock the nozzle on said sleeves; and means connecting the lower control rod guide thimble sleeves to said bottom nozzle.

2. The fuel assembly according to claim 1 wherein a section of said sleeve extending through the top nozzle has a greater outer diameter than the remaining portions thereof to provide a sleeve thickness sufficient to accept a groove into which the fastener projects.

3. The fuel assembly according to claim 1 wherein each mechanical fastener on the top nozzle upper surface includes a ring located in a recess on said nozzle and having an inner surface which projects into a groove on the sleeve outer surface to thereby lock the sleeve and nozzle together; and each stop member is positioned in a slot on the opposite side of said nozzle and is immovably held in a groove on said sleeve so that when the upper rings are removed from the groove in said sleeves, the nozzle may be lifted from said sleeves.

4. The fuel assembly according to claim 3 wherein each of said rings comprises a snap ring located in said recess and groove; and each stop member includes a bowed ring on which said nozzle rests and having its inner surface in a groove on said sleeve, the arrangement being such that when the nozzle is placed on said sleeves, each bowed ring is compressed to thereby permit the insertion of the snap ring into said groove on each sleeve.

5. The fuel assembly according to claim 1 wherein said connecting means includes a plug in each sleeve interconnecting the lower sleeves with said bottom nozzle; and means on the lower side of said nozzle which engages said nozzle and each plug for locking the bottom nozzle to said lower sleeve.

6. The fuel assembly according to claim 5 wherein each plug is threaded on its outer surface and is arranged to engage corresponding threads on the inner surface of means connected to each control rod guide thimble in each sleeve so that when the plug is rotated, the parts are drawn tightly together to form a rigid connection between the control rod guide thimble sleeves and the bottom nozzle; and said means on the lower side of the nozzle includes a locking ring which coacts with the bottom nozzle and a groove in each plug to lock the parts together.

* * * * *